United States Patent
Li (10) Patent No.: US 10,397,318 B2
(45) Date of Patent: Aug. 27, 2019

(54) AUTOMATED INFORMATION LOGGING AND VIEWING SYSTEM FOR HYDROCARBON RECOVERY OPERATIONS

(71) Applicant: Halliburton Energy Services, Inc., Houston, TX (US)

(72) Inventor: Wanqiang Li, Beijing (CN)

(73) Assignee: Halliburton Energy Services, Inc., Houston, TX (US)

( * ) Notice: Subject to any disclaimer, the term of this patent is extended or adjusted under 35 U.S.C. 154(b) by 256 days.

(21) Appl. No.: 14/898,664

(22) PCT Filed: Jul. 24, 2013

(86) PCT No.: PCT/CN2013/080017
§ 371 (c)(1),
(2) Date: Dec. 15, 2015

(87) PCT Pub. No.: WO2015/010279
PCT Pub. Date: Jan. 29, 2015

(65) Prior Publication Data
US 2016/0134693 A1 May 12, 2016

(51) Int. Cl.
*G06F 15/16* (2006.01)
*H04L 29/08* (2006.01)
(Continued)

(52) U.S. Cl.
CPC .......... *H04L 67/1095* (2013.01); *G06F 17/30* (2013.01); *H04L 43/10* (2013.01); *H04L 67/42* (2013.01)

(58) Field of Classification Search
CPC .... G06F 17/30; G06F 9/546; G06F 2209/548; G06F 9/466; G06F 9/542; G06F 19/20;
(Continued)

(56) References Cited

U.S. PATENT DOCUMENTS

| | | | |
|---|---|---|---|
| 8,079,038 B2 | 12/2011 | Caron | |
| 8,799,400 B2 * | 8/2014 | Watte | H04L 51/043 709/206 |

(Continued)

FOREIGN PATENT DOCUMENTS

| | | |
|---|---|---|
| AU | 2003237197 A1 | 11/2003 |
| CN | 1291747 A | 4/2001 |

(Continued)

OTHER PUBLICATIONS

Office Action issued in related CA Application No. 2915395, dated Jun. 23, 2017 (4 pages).

(Continued)

*Primary Examiner* — Joseph E Avellino
*Assistant Examiner* — Rachel J Hackenberg
(74) *Attorney, Agent, or Firm* — John Wustenberg; Baker Botts L.L.P.

(57) ABSTRACT

An example method for automated message logging may include receiving a message from a first client in communication with a server. The received message may be placed the in a first queue at the server. The received message may be processed at the server, and the processed received message may be placed in a second queue for broadcast to a second client in communication with the server. The example method may further include broadcasting the processed received message to the second client, and placing the processed received message in a third queue for persistent storage.

20 Claims, 9 Drawing Sheets

(51) Int. Cl.
*G06F 17/30* (2006.01)
*H04L 12/26* (2006.01)
*H04L 29/06* (2006.01)

(58) Field of Classification Search
CPC ..... H04L 43/10; H04L 67/1095; H04L 67/42; H04L 49/90; H04L 51/18; H04L 47/50; H04L 51/26; H04L 47/6295; H04B 5/0031; H04W 84/18; H04W 4/38; H04W 4/70; H04W 4/027
See application file for complete search history.

(56) References Cited

U.S. PATENT DOCUMENTS

| | | | | |
|---|---|---|---|---|
| 2005/0044151 | A1* | 2/2005 | Jiang | G06F 9/546 709/206 |
| 2005/0216421 | A1* | 9/2005 | Barry | G06F 11/0709 705/64 |
| 2006/0026149 | A1 | 2/2006 | Marsh et al. | |
| 2007/0121645 | A1* | 5/2007 | Dillow | G06F 9/546 370/395.54 |
| 2013/0090907 | A1* | 4/2013 | Maliassov | G06F 17/5009 703/10 |
| 2014/0089406 | A1* | 3/2014 | Gniffke | H04L 67/147 709/204 |

FOREIGN PATENT DOCUMENTS

| | | |
|---|---|---|
| CN | 101207518 A | 6/2008 |
| CN | 102611611 A | 7/2012 |
| WO | 03/096073 A1 | 11/2003 |

OTHER PUBLICATIONS

International Search Report and Written Opinion issued in related PCT Application No. PCT/CN2013/080017 dated May 6, 2014, 12 pages.

* cited by examiner

AUTOMATED INFORMATION LOGGING AND VIEWING SYSTEM FOR HYDROCARBON RECOVERY OPERATIONS

CROSS-REFERENCE TO RELATED APPLICATION

The present application is a U.S. National Stage Application of International Application No. PCT/CN2013/080017 filed Jul. 24, 2013, which is incorporated herein by reference in its entirety for all purposes.

BACKGROUND

The present disclosure relates generally to well drilling operations and, more particularly, to an automated information logging and viewing system for hydrocarbon recovery operations.

Hydrocarbons, such as oil and gas, often reside in various forms within subterranean geologic formations. Extracting the hydrocarbon can include drilling operations and numerous other actions that require coordinated efforts by multiple operators and engineers on the surface. Coordination and communication between the parties can be difficult, as can monitoring the processes and operations to ensure they are performed correctly. Likewise, data generated during the hydrocarbon recovery operations can be difficult to distribute amongst the parties that need to see it for decision-making purposes.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to receiving and measuring expelled gas from a core sample.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. The indefinite articles "a" or "an," as used herein, are defined to mean one or more than one of the elements that it introduces.

For purposes of this disclosure, an information handling system or computing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. Example information handling systems include server systems, computer terminals, handheld computing devices, tablets, smartphones, etc.

Figure 1:
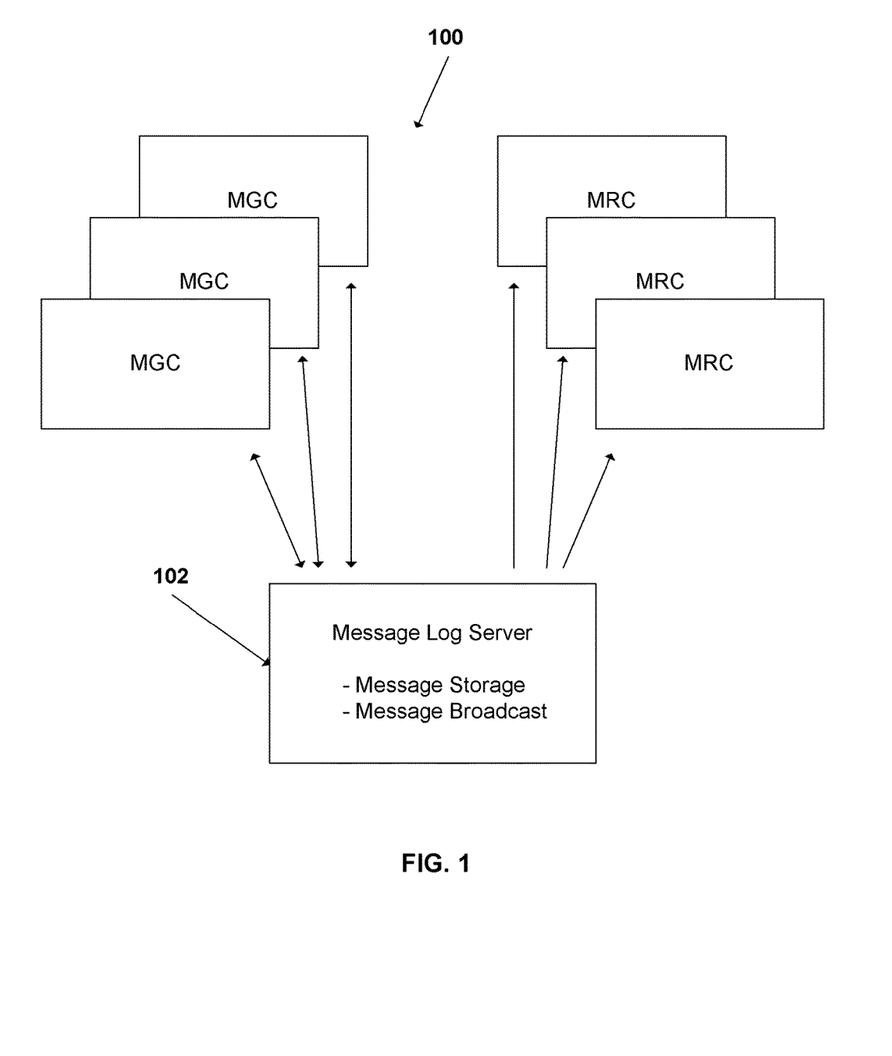
FIG. 1 is a diagram of an example message logging system, according to aspects of the present disclosure.

FIG. 1 is a diagram illustrating a message logging system 100, according to aspects of the present disclosure. The message logging system 100 comprises a message log server (MLS) 102, at least one message generating client (MGC), and at least one message receiving client (MRC). The MLS 102 may comprise an information handling system implemented on one or more server systems that are located together in a data center or physically separated but logically connected via a network. As will be described below, the MLS 102 may comprise functionality, including software or stored algorithms, that receives messages or logs from the MGC, processes and stores the messages or logs, and broadcasts the messages or log to the MRCs in real-time or near real time. The functionality may be implemented on one or more server systems within the MLS 102, which may be standalone hardware devices or instances running on a single hardware device. For example, the MLS 102 may include a server instance for receiving message, a server instance for broadcasting or transmitting the messages, and a server/database instance for storing the messages. Example messages or logs may include various types of information to be tracked and transmitted to others involved in the hydrocarbon recovery operation, including notifications, errors, warnings, comments, etc. As will be described below, the MLS 102 may comprise at least three asynchronous queues that are implemented on at least on memory device coupled to the MLS 102. The at least three asynchronous queues may correspond to receipt of the messages from the MGCs, transmission of the messages to the MRCs, and storage of the massages at the MLS. This may provide for improved performance and efficiency of the MLS.

The MGCs and MRCs may be communicably coupled to the distributed messaging system 100 through a network. The network may any type of network that would be appreciated by one of ordinary skill in the art in view of this disclosure, e.g., a local area network (LAN), a wireless LAN, a wide area network, etc. In certain embodiments, the MGCs and MRCs may be software applications stored and run at on an information handling system. For example, the MGCs and MRCs may comprise a set of instructions stored and run on a mobile computing device, such as a tablet computer, a laptop, or a smartphone. In certain embodiments, the MGCs and MRCs may comprise software instances that are run through a central database, or the message logging system 102 with the mobile computing device functioning as a "client" of the database. Additionally, in certain embodiments, the MGCs and MRCs may run simultaneously on a single mobile computing device.

MGCs may comprise a graphical user interface that allow users to access the logging system, control the message log and transmission, and transmit messages or logs to the MLS 102. In certain embodiments, the MGC instances may comprise interfaces that are either defined by the message logging system 100, or access communications ports that are identified and defined within the message logging system. This may make it easier for software developers, who may access and utilize the interfaces of the message logging system 100 rather than designing subsystems with overlapping functionality. In contrast, MRCs may provide a simplified interface that displays certain messages to the user. The types of information displayed may be controlled through the MLS 102. For example, as will be described below, the MRCs and MGCs may register with or subscribe to the MLS 102. Through the registration/subscription process, the user of the MRC may be identified, and the server may limit the message logs that are transmitted or broadcast to the MRC based on that registration.

In operation, a field engineer or operator may have a mobile computing device running a MGC instance, and may register the MGC instance with the MLS 102. Although a mobile computing device may be typical, it is not required. The MGC instance may provide an interface through which field engineer may generate messages that relate to the hydrocarbon recovery operation. The MGC instance may function with the hardware of the mobile computing device to transmit the message to the MLS 102. As will be described below, the MLS 102 may include functionality to receive, process, and broadcast the message. Each of the steps may have corresponding asynchronous queues, which may allow for parallel processing, and processing when the network connections are down. The MLS 102 may broadcast the message to mobile computing devices running MRC instances, which may be operated by engineering managers who need to view the progress of the operation without generating messages directly. The functionality and processes of the message logging system 100 may be implemented as algorithms in one or more of the MGCs, the MLS 102, and the MRCs. As used herein, an algorithm may be implemented, for example, as a set of instructions stored within an information handling system that causes a processor of the information handling system to perform a pre-determined set of actions.

Figure 2:
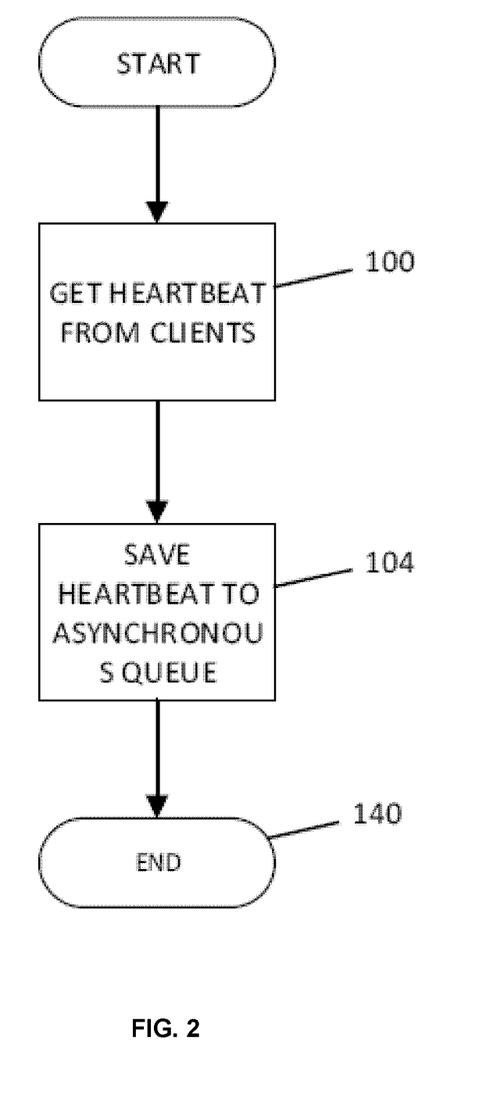
FIG. 2 is a flow diagram of an example client detection process, according to aspects of the present disclosure.

FIG. 2 is a flow diagram of an example client detection process within a MLS, according to aspects of the present disclosure. An MLS may receive "heartbeats" from a client, which may be a predetermined set of characters that are received through a network channel. The "heartbeats" may be used to detect if any new clients (MGCs and MRCs) are available or if any existing clients have lost their connectivity or are dormant. The client may receive heartbeats from one or more clients during a given period of time (block 100). Those heartbeats may be stored in a data structure in the server, such as a first asynchronous queue (block 104). Storing the heartbeats may allow for the MLS to collect the heartbeats for later processing, while performing other actions needed for the message logging system. In certain embodiments, if the MLS receives a heartbeat, the server will send a callback heartbeat back to clients to establish the reliability of the connection between them.

Figure 3:
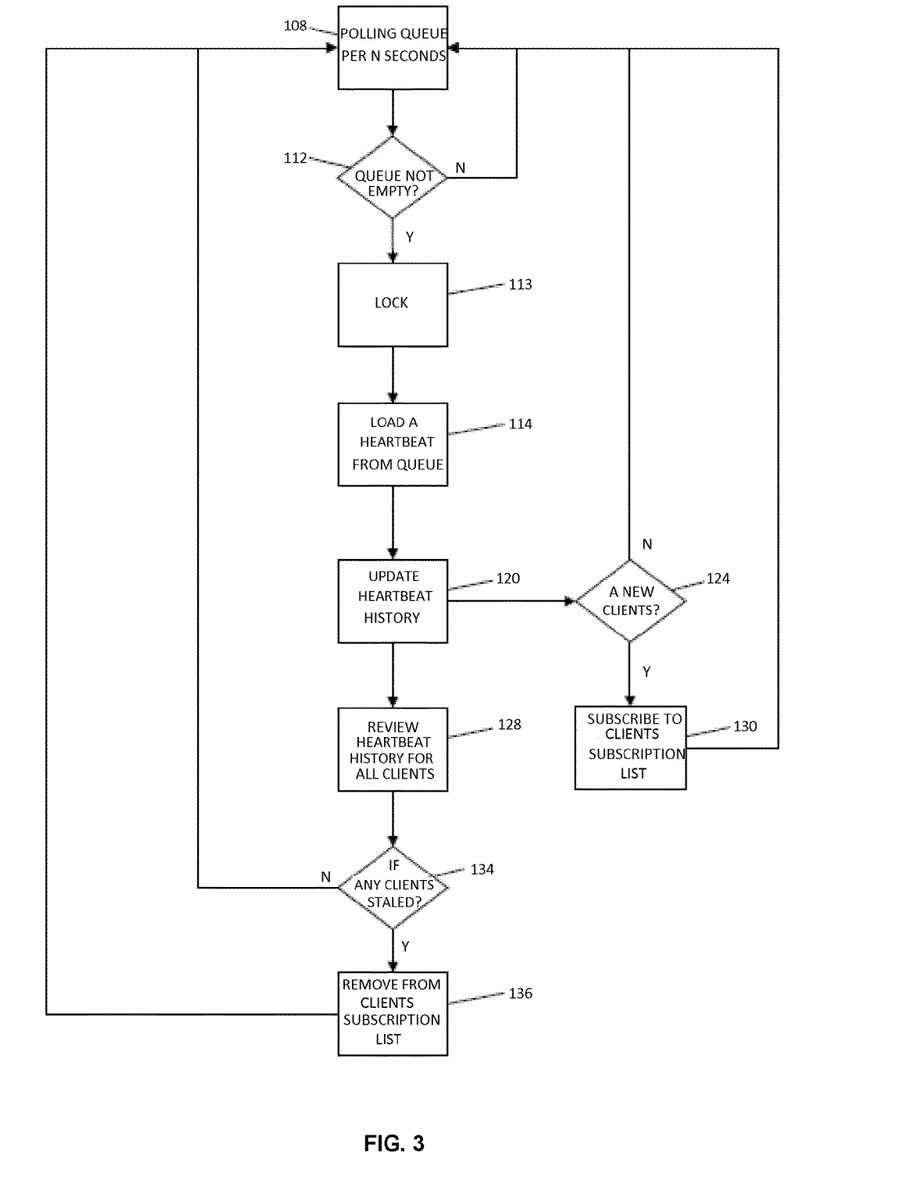
FIG. 3 is a flow diagram of an example heartbeat handling process, according to aspects of the present disclosure.

FIG. 3 is a flow diagram of an example heartbeat handling process in an MLS, according to aspects of the present disclosure. In the embodiment shown, a loop thread may be used to poll the first asynchronous queue regarding the presence of stored heartbeats (block 108). If the queue is not empty (block 112), the queue will be locked to prevent other heartbeats from being added during processing (block 113). The heartbeats within the first asynchronous queue may be loaded (block 114) and a heartbeat history may be updated with the latest timestamp in a second data structure (block 120). The second data structure may comprise a subscription list that contains the identities of clients already connected to the server, e.g., existing MRCs and MGCs. If the loaded heartbeat is from a new client (block 124), then the client may be added or subscribed to the subscription list of server (block 130); otherwise, the subscription list may be refreshed and all of the subscribed clients reviewed (block 128) to check if any clients are already staled or redundant (block 134). If there is any client already disconnected, then it is removed from the subscription list of server (block 136).

The subscription list may be useful to identify each client which connected to the server. The subscription list may include the identity of the MRC or MGC and the type of device corresponding to the client as well as the user of the client, in order to determine how the client interacts with the server. For example, when server wants to broadcast any real-time messages came from the MGCs, the server needs to know the identifications of the MRCs to make sure the messages are received by the MRCs. Also, clearing the subscription list of unused or redundant client makes the memory usage much more reasonable and efficient.

Figure 4:
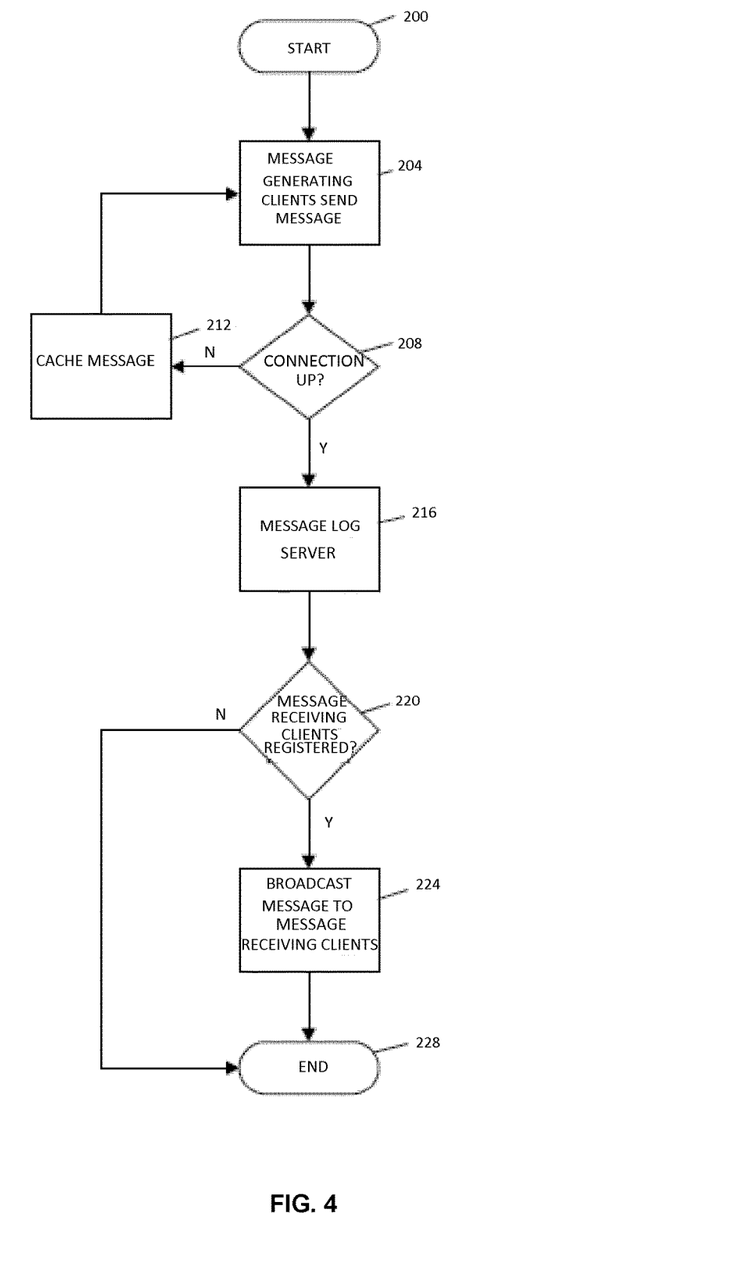
FIG. 4 is a flow diagram of an example message transmission process, according to aspects of the present disclosure.

Once an MGC is connected to the MLS, it may transmit message logs to the MLS, which may in turn broadcast the message to a connected MRC. FIG. 4 is a flow diagram of an example message transmission process, according to aspects of the present disclosure. In the embodiment shown, an MGC may attempt to transmit a message to the MLS (block 204). The MGC may check the connectivity between the mobile computing device and the MLS (block 208). If it connected to the MLS, the MGC may send the message to the MLS within a batch or single transmission (block 216); otherwise, the MGC may cache the message into a local file system at the mobile computing device (block 212). Once the MLS receives the message (block 220), it will process the message and then broadcast it to any registered MRC (block 224).

Figure 5:
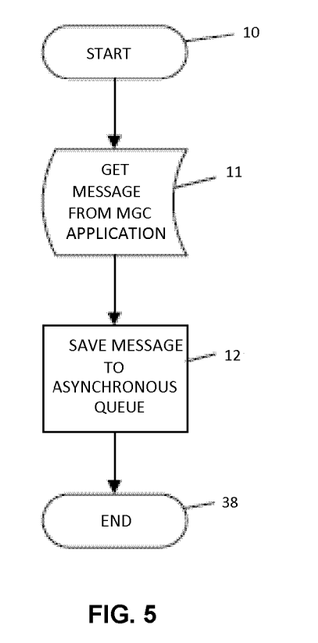
FIG. 5 is a flow diagram of an example message queuing process, according to aspects of the present disclosure.

FIG. 5 is a flow diagram of an example message queuing process in an information handling system running an MGS instance, according to aspects of the present disclosure. In the embodiment shown, message generated by the MGC instance on an information handling system may be retrieved (block 11). The information handling system may save the message to a queue, such as a second asynchronous queue, for sending them to the MLS at a later time (block 12). This may be useful, for example, when the connection is down between the MGC and the MLS.

Figure 6:
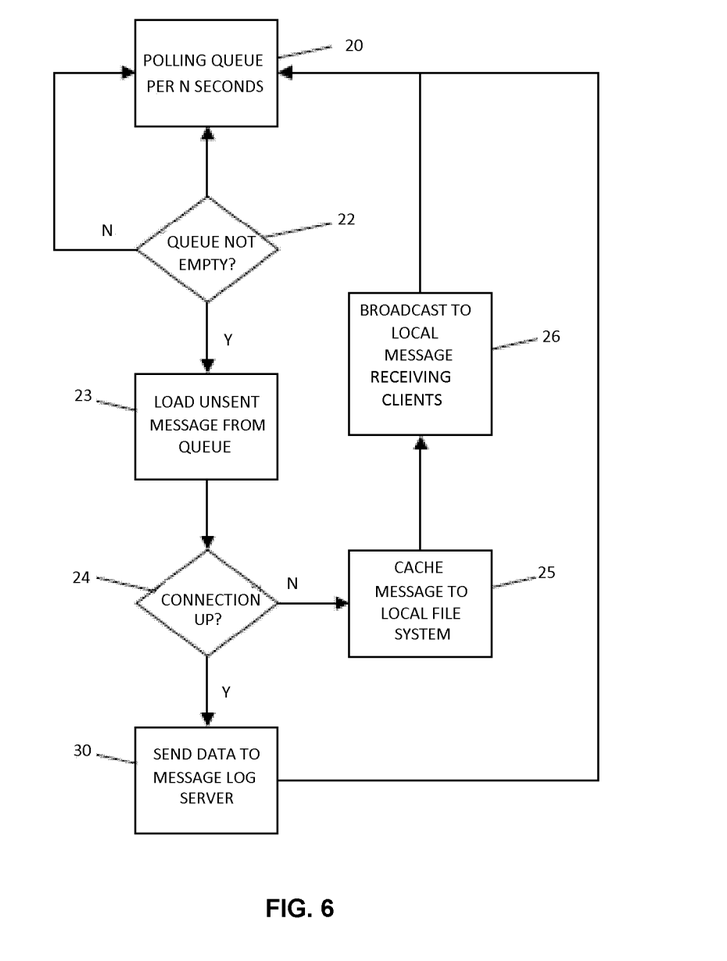
FIG. 6 is a flow diagram of an example message transmission process, according to aspects of the present disclosure.

FIG. 6 is a flow diagram of an example message transmission process from a MGC instance, according to aspects of the present disclosure. The MGC may periodically poll the second asynchronous queue (block 20), and check if the queue is empty or not (block 22). If there are any messages waiting to be sent to the MLS, the messages may be fetched and loaded (block 23) into a transmission process running at the MGC instance. If the connection is available between the MGC and the MLS (block 24), the message may be sent to the MLS (block 30). If the connection is not available, then the messages may be again cached into the local file system of the information handling system running the MGC instance (block 25). In certain embodiments, if any MRCs are locally connected to the MGC, the message can be broadcast locally to the MRCs from the MGC (block 26). In certain embodiments, when a new message has been generated by the MGC, the asynchronous queue may be queried to see if there are any unsent/cached messages, and those items can be fetched first and merged with the new messages in a time-order for a batch transmission to the MLS (block 23).

Figure 7:
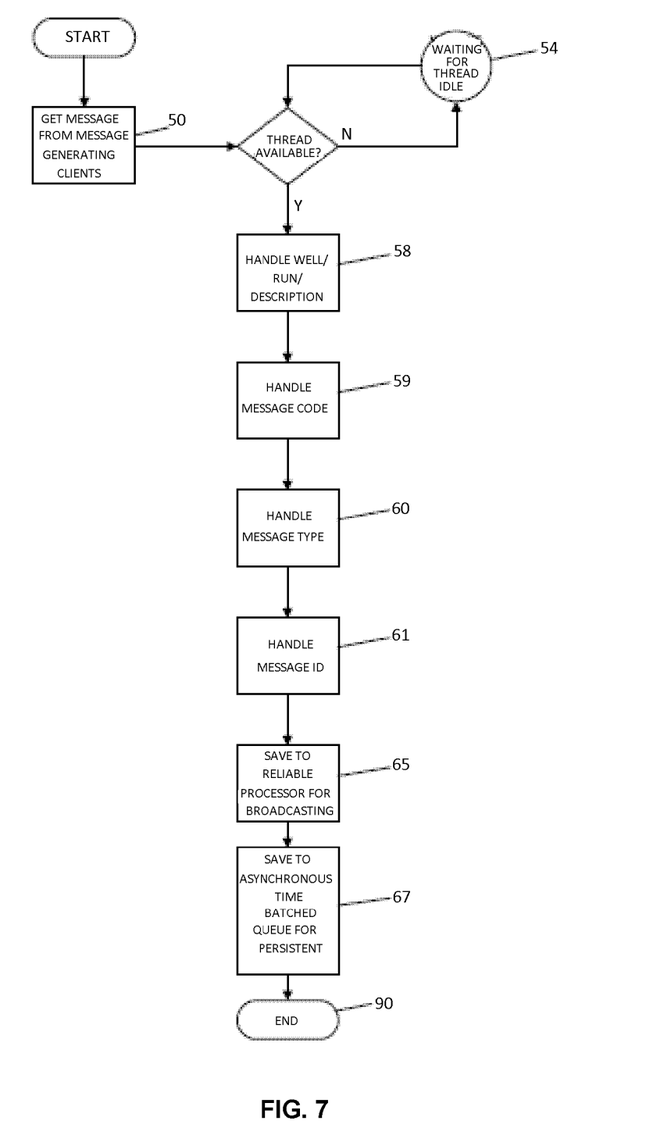
FIG. 7 is a flow diagram of an example message handling process, according to aspects of the present disclosure.

FIG. 7 is a flow diagram of an example message handling process at an MLS, according to aspects of the present disclosure. In certain embodiments, the MLS may comprise a working thread of devoted processing resources. When any new message is received (block 50), it will be determined if the thread is available to handle the message (block 54). While the system is waiting for the thread to become available, the new message as well as any subsequently received messages may be stored in a first MLS asynchronous queue, where they will be retrieved when the thread becomes available. If the thread is available, it will handle the message. Handling the message may include, for example, parsing the message to retrieve information located at predetermined locations within the message. In certain embodiments, the message may comprise and the MLS may handle well/run/descriptions (block 58), message code (block 59), message type (block 60), and message ID (block 61). As used herein, the well/run/description may comprise the locations (storage devices and MRCs) to which the message should be stored and broadcasted; the message code may comprise part of a code system that represent a pre-defined message; the message type may identify a predefined type for the message, e.g., error, information, data, success, retry, user comments, warning, etc., that may provide context for the message itself; and the message ID may comprise encryption/ID keys, an identification of the information handling system that sent the message, and application (MGC) corresponding to the message, where the user provides the keys, the information handling system identification will be retrieved by the MGC interface automatically, and the user can specify the application or it can be retrieved by the MGC interface automatically. The processed message may be saved to a second MLS asynchronous queue for broadcasting by a broadcast server within the MLS (block 65). The second MLS asynchronous queue may provide a reliable location to stored processed signals if the broadcasting process is slower than the message handling. Thus, even if the broadcasting process is behind, the MLS may continue handling the message and the MGC may continue sending the messages without generating an error. The message may also be copied and saved into a third MLS asynchronous queue for persistent storage (block 67).

Figure 8:
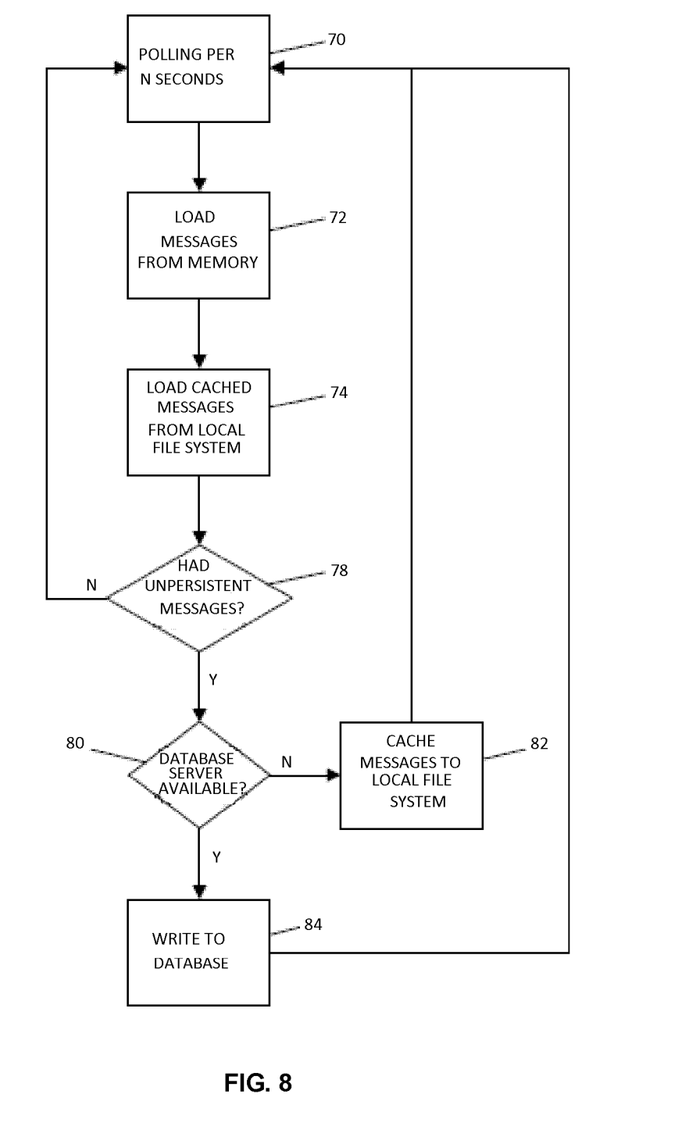
FIG. 8 is a flow diagram of an example received message storage process, according to aspects of the present disclosure.

FIG. 8 is a flow diagram of an example received message storage process in an MLS, according to aspects of the present disclosure. The third MLS asynchronous queue may be periodically polled at the MLS (block 70). If new message to be stored are available, they may be loaded into active memory (e.g., RAM) (block 72) as will the cached messages from the third asynchronous queue in the local file system. The thread will load all of the new messages first, and merge them with the messages loaded from the asynchronous queue. If there are any unpersistent new messages (block 78), and the database server is available (block 80), then the entire batch will be written to the database (block 84); otherwise the messages will be cached to the third asynchronous queue (block 82) for next time. In certain embodiments, certain MGCs may access the database to view stored messages. This may provide for tracking of certain information and problems that correspond to a particular hydrocarbon recovery operation.

Figure 9:
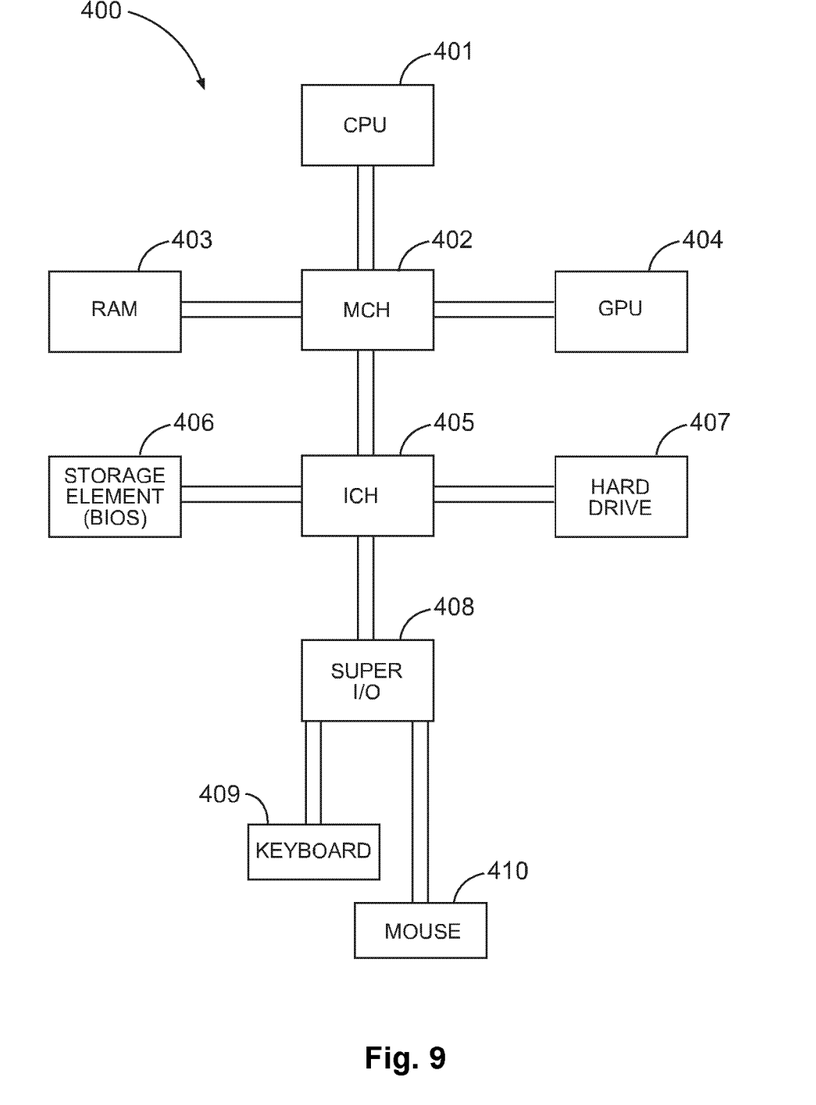
FIG. 9 is a block diagram of an example information handling system, according to aspects of the present disclosure.

FIG. 9 is a block diagram of an example information handling system 400. A processor or CPU 401 of the information handling system 400 is communicatively coupled to a memory controller hub or north bridge 402. Memory controller hub 402 may include a memory controller for directing information to or from various system memory components within the information handling system, such as RAM 403, storage element 406, and hard drive 407. The memory controller hub 402 may be coupled to RAM 403 and a graphics processing unit 404. Memory controller hub 402 may also be coupled to an I/O controller hub or south bridge 405. I/O hub 405 is coupled to storage elements of the computer system, including a storage element 406, which may comprise a flash ROM that includes a basic input/output system (BIOS) of the computer system. I/O hub 405 is also coupled to the hard drive 407 of the computer system. I/O hub 405 may also be coupled to a Super I/O chip 408, which is itself coupled to several of the I/O ports of the computer system, including keyboard 409 and mouse 410. In certain embodiments, the Super I/O chip may also be connected to and receive input from a sensor assembly, similar to the sensor assembly from FIG. 2. The chip 408 may receive input from the sensor assembly directly, or indirectly, through an intermediate device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A method for automated message logging, comprising:
receiving a request to register a first client running a first message generating client instance to a server, Wherein the first message generating client instance provides an interface through which one or more messages are generated that related to a hydrocarbon recovery operation;
identifying a user of the first client;
limiting broadcasts to the first client based, at least in part, the registration;
receiving a message from first client in communication with server;
placing the received message in a first queue at the server;
determining availability of a working thread of one or more devoted processing resources;
retrieving the message from the first queue based on the availability determination of the working thread;
processing the received message at the server;
placing the processed received message in a second queue for broadcast to a second client in communication with the server, wherein the second client runs a first message receiving client instance, and wherein the first message receiving client instance allows viewing of the received message;
broadcasting the processed received message to the second client; and
placing the processed received message in a third queue for persistent storage.

2. The method of claim 1, wherein the first client and the second client are registered with the server.

3. The method of claim 2, wherein the first client comprises a message generating client and the second client comprises a message receiving client.

4. The method of claim 1, further comprising receiving a heartbeat at the server from at least one of the first client and the second client.

5. The method of claim 1, wherein the message comprises at least one of
well/run/descriptions;
a message code;
a message type; and
a message ID.

6. The method of claim 5, wherein processing the received message at the server comprises parsing the received message to determine at least one of the well/run/descriptions; the message code; the message type; and the message ID.

7. The method of claim 1, wherein processing the received message at the server comprises retrieving the received message from the first queue when a first thread of the server is available.

8. The method of 1, wherein broadcasting the processed received message to the second client comprises retrieving the processed received message from the second queue when the connection to the second client is available.

9. The method of claim 1, further comprising retrieving the processed received message from the third queue and storing the processed received message to a database coupled to the server.

10. The method of claim 1, wherein at least one of the first queue, the second queue, and the third queue comprises an asynchronous queue.

11. A system for automated message logging, comprising:
a first client;
a second client;
a server in communication with the first client and the second client, wherein the server comprises a processor and memory device coupled to the processor, and the memory device contains a set of instruction that, when executed by the processor, cause the processor to:
receive a request to register the first client running a first message generating client instance to the server, wherein the first message generating client instance provides an interface through which one or more messages are generated that related to a hydrocarbon recovery operation;

identy a user of the first client:
limit broadcasts to the first client based, at least in part, on the registration;
receive a message from the first client;
place the received message in a first queue at the server;
determine availability of a working thread of one or more devoted processing resources;
retrieve the message from the first queue based on the availability determination of the working thread;
process the received message at the server;
place the processed received message in a second queue for broadcast to the second client, wherein the second client runs a first message receiving client instance, and wherein the first message receiving client instance allows viewing of the received message;
broadcast the processed received message to the second client; and
place the processed received message in a third queue for persistent storage.

12. The system of claim 11, wherein the first client and the second client are registered with the server.

13. The system of claim 12, wherein the first client comprises a message generating client and the second client comprises a message receiving client.

14. The system of claim 11, wherein the set of instructions further cause the processor to receive a heartbeat at the server from at least one of the first client and the second client.

15. The system of claim 11, wherein the message comprises at least one of
well/run/descriptions;
a message code;
a message type; and
a message ID.

16. The system of claim 15, wherein the set of instructions that cause the processor to process the received message at the server further cause the processor to parse the received message to determine at least one of the well/run/descriptions; the message code; the message type; and the message ID.

17. The system of claim 11, wherein the set of instructions that cause the processor to process the received message at the server further cause the processor to retrieve the received message from the first queue when a first thread of the server is available.

18. The system of claim 11, wherein the set of instructions that cause the processor to broadcast the processed received message to the second client further cause the processor to retrieve the processed received message from the second queue when the connection to the second client is available.

19. The system of claim 11, wherein the set of instructions further cause the processor to retrieve the processed received message from the third queue and store the processed received message to a database coupled to the server.

20. The system of claim 11, wherein at least one of the first queue, the second queue, and the third queue comprises an asynchronous queue.

* * * * *